US006512479B1

(12) United States Patent
Sahai et al.

(10) Patent No.: US 6,512,479 B1
(45) Date of Patent: Jan. 28, 2003

(54) SIGNAL ACQUISITION USING DATA BIT INFORMATION

(75) Inventors: Anant Sahai, San Mateo, CA (US); Wallace Mann, Mill Valley, CA (US); Andrew Chou, San Mateo, CA (US); Benjamin Van Roy, San Mateo, CA (US)

(73) Assignee: Enuvis, Inc., South San Francisco, CA (US)

( * ) Notice: Subject to any disclaimer, the term of this patent is extended or adjusted under 35 U.S.C. 154(b) by 0 days.

(21) Appl. No.: 09/888,228

(22) Filed: Jun. 22, 2001

(51) Int. Cl.[7] .............................................. H04B 7/185
(52) U.S. Cl. .............................. 342/357.15; 342/357.05
(58) Field of Search ....................... 342/357.05, 357.06, 342/357.12, 357.15; 701/213, 215

(56) References Cited

U.S. PATENT DOCUMENTS

| | | | | |
|---|---|---|---|---|
| 4,701,934 A | * | 10/1987 | Jasper | 375/1 |
| 5,663,734 A | | 9/1997 | Krasner | 342/357 |
| 5,781,156 A | | 7/1998 | Krasner | 342/357 |
| 5,884,214 A | | 3/1999 | Krasner | 701/207 |
| 6,078,286 A | * | 6/2000 | Gonzales et al. | 342/359 |
| 6,133,874 A | * | 10/2000 | Krasner | 342/357.15 |
| 6,272,430 B1 | | 8/2001 | Krasner | 701/207 |
| 6,327,473 B1 | | 12/2001 | Soliman et al. | 455/456 |
| 6,392,593 B1 | * | 5/2002 | Pemble | 342/357.15 |

OTHER PUBLICATIONS

Tsui, James Bao–Yen, "Fundamentals of Global Positioning System Receivers: A Software Approach," Wiley, 2000, pp. 149–150.
Psiaki, Mark L., "Block Acquisition of Weak GPS Signals in a Software Receiver," Cornell University Presented at ION GPS 2001, Sep. 11–14 2001, Salt Lake City, pp. 1–13.

* cited by examiner

*Primary Examiner*—Dao Phan
(74) *Attorney, Agent, or Firm*—MacPherson Kwok Chen & Heid LLP; Edward C. Kwok

(57) ABSTRACT

Techniques are provided for aiding in acquiring a signal using the data bit information that is associated with each signal source. One aspect of the invention is to use the data bit information that is associated with each signal source when calculating the In Phase and Quadrature correlation integrals by using the sampled data associated with the received signal. By using the data bit information that is associated with each signal source, coherent correlation may be performed by breaking the signal into data blocks and performing calculations on a block-by-block basis. Coherent correlation is the calculation of In Phase and Quadrature correlation integrals for sampled data that is associated with the received signal.

19 Claims, 8 Drawing Sheets

SIGNAL ACQUISITION USING DATA BIT INFORMATION

FIELD OF THE INVENTION

The present invention relates to signal processing and, more particularly, to techniques for aiding in the acquisition of a signal using data bit information that is associated with the signal.

BACKGROUND OF THE INVENTION

The location of a device may be determined using a global positioning system ("GPS"). In a general GPS system, a receiver acquires signals from four or more satellite vehicles to obtain a three dimensional location and the current time stamp. A receiver may employ multiple channels and the received signal may be processed in each channel to acquire a signal from a single signal source. After acquisition, a delay-locked loop is traditionally used to track the signal source.

GPS satellite vehicles emit two microwave carrier signals of L1 and L2 frequency. The two microwave carrier signals are modulated by: 1) a C/A code (Coarse Acquisition), 2) a P-Code (Precise), and 3) a data message.

The C/A code is a repeating 1 MHz Pseudo Random Noise (PRN) code that modulates the L1 carrier phase. The C/A PRN code comprises 1023 bits in order that are repeated every millisecond. There is a different C/A PRN code for each GPS satellite vehicle. The P-Code modulates both the L1 and L2 carrier phases. The P-Code is a 10 MHz PRN code. The data message modulates the L1-C/A code signal. The data message is 50 Hz signal consisting of data bits that encode a time stamp, the GPS satellite vehicle orbit parameters, clock corrections, and other parameters. All of this data is useful for the receiver to know in order to calculate and update its position.

In one approach, a receiver may attempt to acquire a signal by: 1) generating a replica PRN code emitted by a satellite vehicle that is potentially visible overhead the receiver, and 2) determining a correlation between the received signal and the suitably modulated replica code. Typically, the correlation between the received signal and the replica code is performed by calculating both the In Phase ("I") and Quadrature ("Q") correlation integrals. One issue that arises is that the signal from the satellite is also modulated by data bits using phase modulation. These data bits are unknown at a standard standalone receiver and as a result, the I and Q correlation integrals can not reliably be extended coherently beyond the length of one data bit. One existing approach around this problem is to combine the I and Q correlation integrals non-coherently between data bits. This also helps by mitigating the impact of uncertainty in the carrier modulation frequency.

One salient disadvantage to the non-coherent approach is that in instances when the received signal is highly degraded (for example, the receiver that is receiving the received signal is inside a building), then the duration of received signal that needs to be processed to compensate for the level of degradation is roughly proportional to the level of degradation raised to the power of two. To illustrate, suppose the received signal is degraded by an additional factor of 100, then the duration of data needed to compensate for the level of degradation is increased proportional to $100^2$ if non-coherent processing is done.

Based on the foregoing, there is a clear need for a technique to avoid non-coherent approaches in correlation calculations during signal processing.

SUMMARY OF THE INVENTION

Techniques are provided for aiding in acquiring a signal using the data bit information that is associated with each signal source. One aspect of the invention is to use the data bit information that is associated with each signal source when calculating the In Phase and Quadrature correlation integrals by using the sampled data associated with the received signal. By using the data bit information that is associated with each signal source., coherent correlation may be performed by breaking the signal into blocks and performing calculations on a block-by-block basis. Coherent correlation is the calculation of In Phase and Quadrature correlation integrals for sampled data that is associated with the received signal.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Techniques are provided for acquiring a signal using the data bits associated with a signal source. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional and Operational Overview

Figure 1:
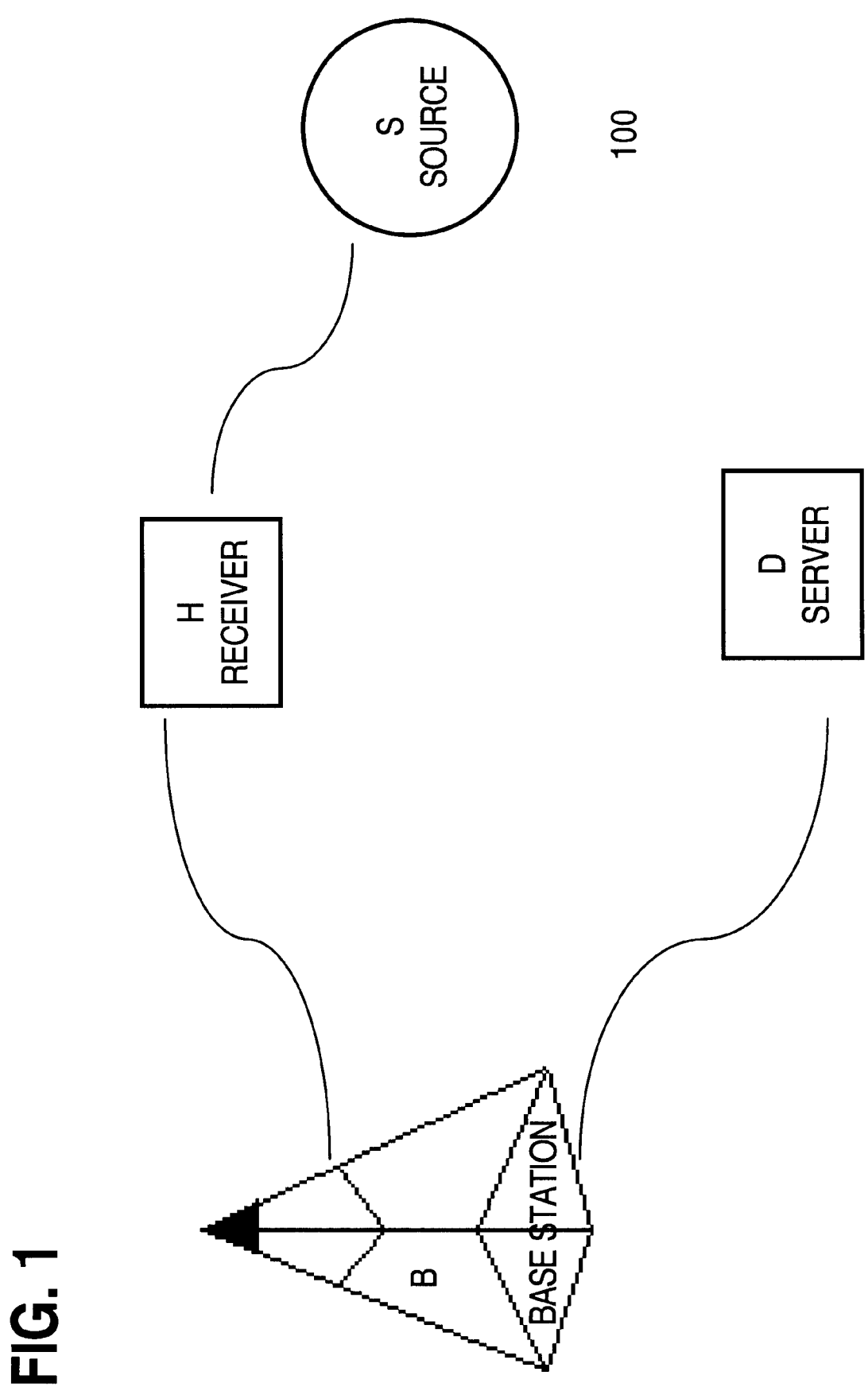
FIG. 1 is a block diagram that illustrates a system overview of acquiring a signal.
Figure 2A:
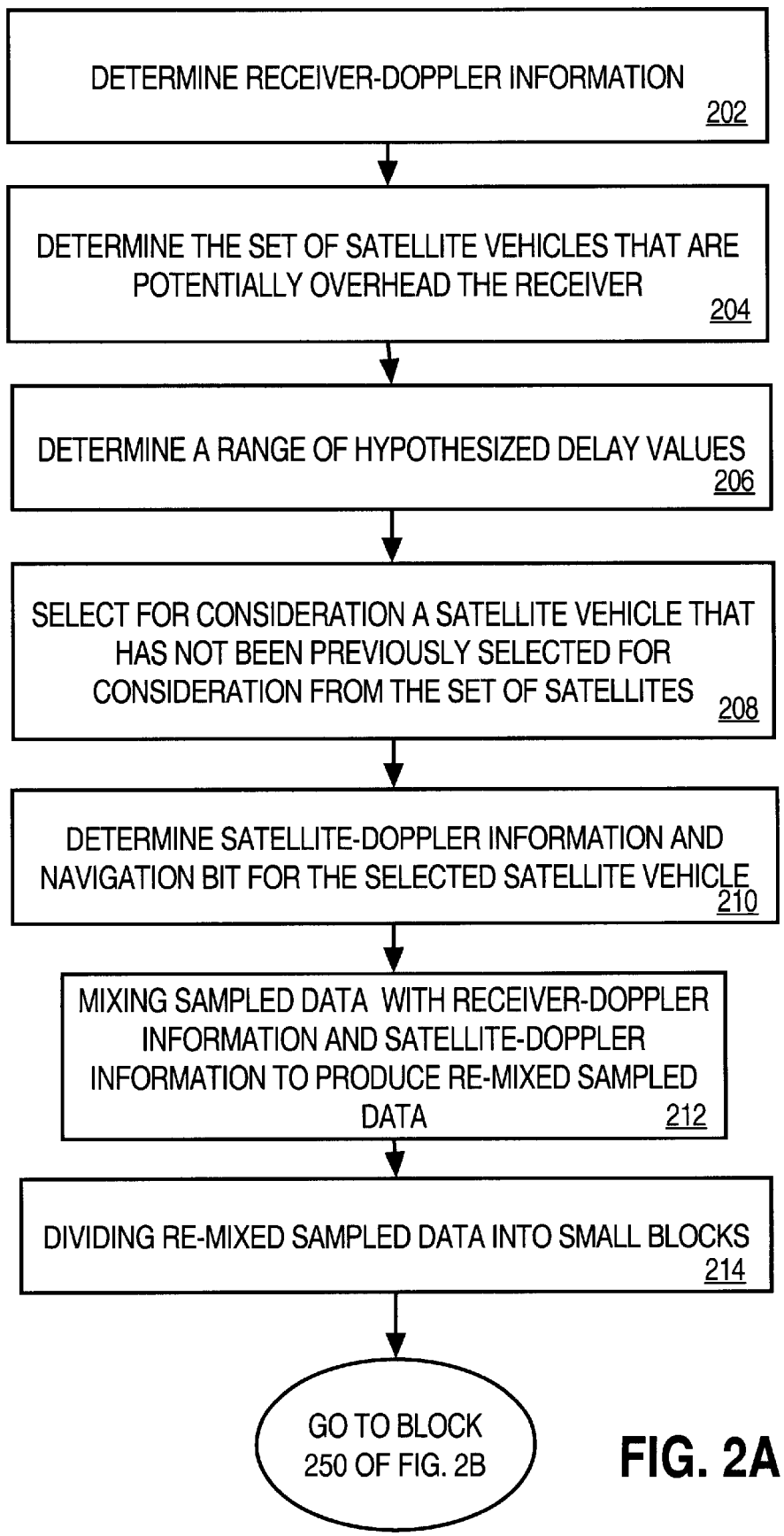
FIG. 2A and FIG. 2B are block diagrams that illustrate techniques that aid in the acquisition of a signal from one satellite.
Figure 2B:
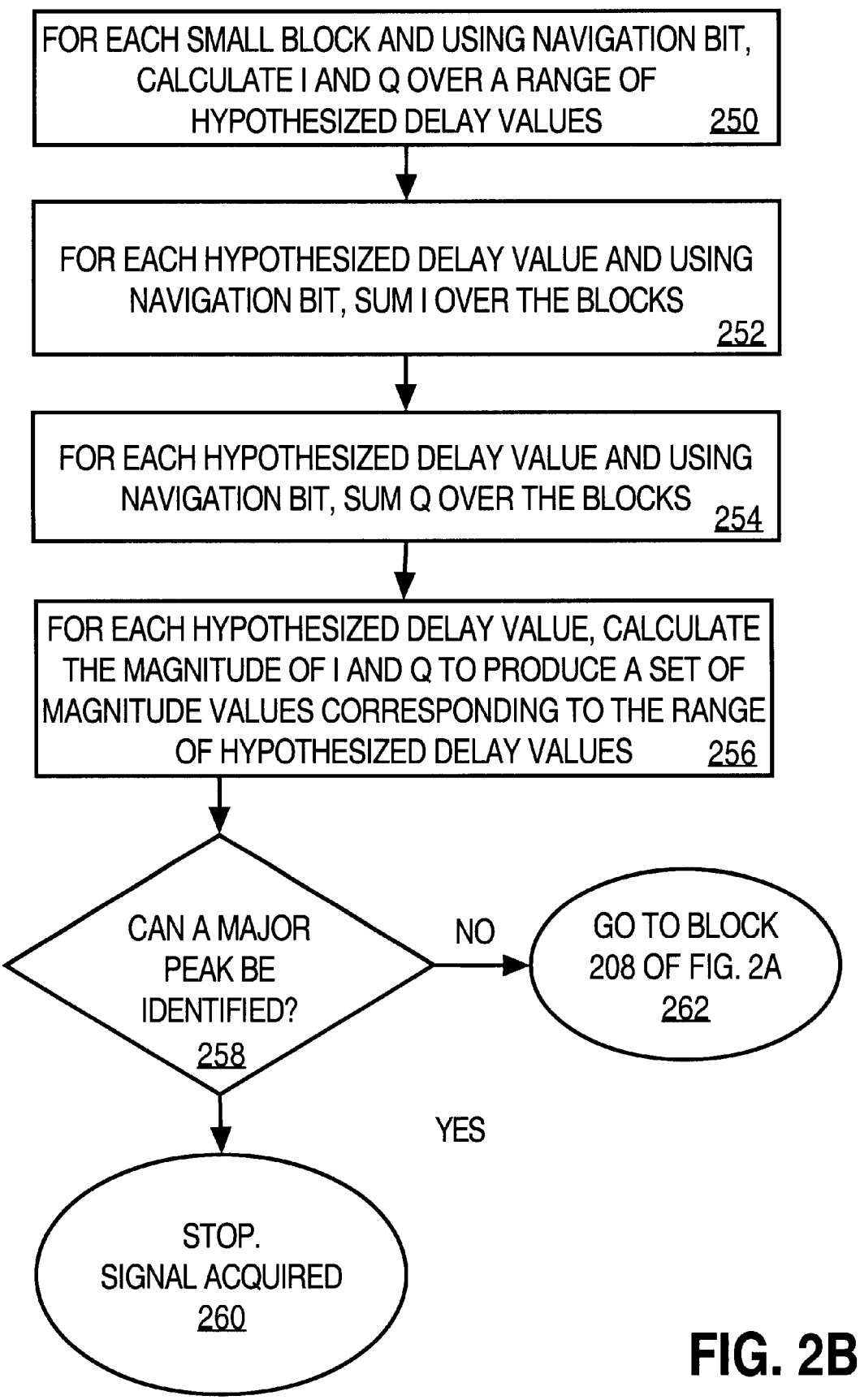

The functional and operational overview of one embodiment of the invention is explained in conjunction with FIG. 1, FIG. 2A and FIG. 2B. FIG. 1 is a block diagram that illustrates a system overview of acquiring a signal. Acquisition system 100 comprises a source S of signal emission, a receiver H, a base station B and a server D. By way of example, only one source, one base station and one server are shown in acquisition system 100. For example, in a practical system, there may be multiple sources of signal emission, multiple receivers, multiple base stations and multiple servers. In other embodiments of the invention, the server may be co-located with the base station.

Examples of sources of signal emission are satellites, terrestrial signal beacons, airborne transmitters, mobile stations, and any other radio or ultrasound transmiter. Examples of receivers are Global Positioning System receivers, cell phones with embedded signal receivers, Personal Digital Assistants (PDAs) with embedded signal receivers, personal computers equipped with software radios, and vehicles with signal reception capabilities.

For the purpose of explanation, Source S may be one of the Global Positioning System (GPS) satellite vehicles that is overhead the location of receiver H. In general, in a GPS system, a receiver needs to acquire signals from four or more satellite vehicles to obtain a three dimensional location.

In FIG. 1, in certain embodiments of the invention, H receives a signal herein referred to as a "received signal". When H receives the received signal, it is not known which GPS satellite vehicles have emissions that are detectable in the received signal. In certain embodiments of the invention, upon receiving the received signal, H converts the continuous wave form of the received signal into discrete values. One method of converting the continuous wave form of the received signal into discrete values is by digitizing the received signal. The digitized received signal is herein referred to as "sampled data". H transmits the sampled data to base station B. H also transmits to the base station the approximate time that H received the received signal. Base station B in turn transmits the sampled data and approximate time to server D. Server D processes the sampled data to acquire a signal. The signal that is acquired is herein referred to as an "acquired signal". In the context of using hardware to correlate signals, signal acquisition involves correlating the sampled data with a modulated and delayed C/A PRN code that matches the C/A PRN code of the particular GPS satellite vehicle whose emissions might be detectable in the sampled data. If the sampled data does not correlate sufficiently with the correct C/A PRN code, then no signal is acquired.

Signal acquisition involves the calculation of the In Phase and Quadrature correlation integrals (I and Q correlation integrals) associated with the sampled data. The I and Q correlation integrals are evaluated for a plurality of different hypothesized time shifts and Doppler shifts in the modulation. One skilled in the art knows that a Doppler shift in the modulation is necessary to deal with the effects of sampling clock-rate inaccuracies (referred to as "clock drift") and the net movement between the receiver and the signal source.

The delay, which is the time it takes an emitted signal to travel from the GPS satellite vehicle to reach the receiver, may be calculated using the parameters of the acquired signal. Such a delay is herein referred to as a "delay value". The delay value corresponding to each of several acquired signals may then be used to calculate the location of the receiver in a given coordinate system. For example, the calculation of the location of the receiver may be performed in an earth-fixed coordinate system.

FIG. 2A and FIG. 2B are block diagrams that illustrate techniques that aid in the acquisition of a signal from one satellite. In certain embodiments of the invention, the sampled data that is received from receiver H is processed at server D. At step 202 of FIG. 2A, the clock drift of receiver H is determined. The clock drift of a receiver is herein referred to as "receiver-doppler information". Various techniques may be used to determine the receiver-doppler information of a receiver. One such technique is described in U.S. patent application Ser. No. 09/888,227, filed on the same day herewith, entitled "Synthesizing Coherent Correlation Sums at One or More Multiple Carrier Frequencies Using Correlation Sums Calculated At A Coarse Set of Frequencies", by inventors Anant Sahai and John Tsitsiklis, (Attorney Docket No. 60021-0012) Another such technique is described in U.S. patent application Ser. No. 09/888,229, filed on the same day herewith, entitled "Determining the Spatio-Temporal and Kinematic Parameters of a Signal Receiver and Its Clock by Information Fusion", by inventors Anant Sahai, Andrew Chou, Wallace Mann and Stefano Casadei, (Attorney Docket No. 60021-0014). Alternatively, one could simply repeat the process with a number of candidate frequencies and pick the one that works best.

At step 204, the set of satellite vehicles that is potentially overhead the receiver H is determined. In certain embodiments of the invention, the set of satellite vehicles that is potentially overhead is determined from: 1) the approximate time that the receiver H received the received signal, 2) the approximate position of the receiver H in an earth-fixed coordinate system, and 3) the orbital data of the satellite vehicles. The approximate position of the receiver H in an earth-fixed coordinate system may be determined by the proximity of the receiver H to a particular base station. For example, the proximity of the receiver H to a particular base station may be determined by identifying the base station to which the receiver H transmitted the sampled data and the approximate time for the sampled data to reach the base station from the receiver H. Alternatively, it may come from another method of determining location and time. The precise orbital data of the entire GPS constellation may be obtained from a Master Control facility such as the one at Schriever United States Air Force Base in Colorado. Alternatively, it may be read from the data messages of the satellites. The identification of the set of satellite vehicles that are potentially overhead the receiver H is described further in patent application Ser. No. 09/782,648, filed on Feb. 12, 2001, entitled "Location-Determination Method and Apparatus", by inventors Benjamin Van Roy, John Tsitsiklis and Andrew Chou (Attorney Docket No. ENUV.P0003).

At step 206, a range of hypothesized delay values is determined by estimating the range of the possible delay in time based on the approximate time when the receiver H received the received signal and the approximate position of receiver H in an earth-fixed coordinate system, combined with some knowledge of the uncertainty in those values. The determination of a range of hypothesized delay values is described in further detail in patent application Ser. No. 09/888,229, filed on the same day herewith, entitled "Determining the Spatio-Temporal and Kinematic Parameters of a Signal Receiver and Its Clock by Information Fusion", by inventors Anant Sahai, Andrew Chou, Wallace Mann and Stefano Casadei, (Attorney Docket No. 60021-0014).

At step 208, a signal source is selected for consideration. At step 210, the true modulation frequency of the selected satellite vehicle and the data bit information of the selected satellite vehicle are determined. The true modulation frequency of a satellite vehicle incorporates the "satellite-doppler information" and relative receiver motion grouped together as $f_i$, as well as the effect of the receivers sampling rate error $f_0$. The data bit information refers to the data message being transmitted by the signal source at that time. The data bit information indicates when the C/A otherwise repeating PRN codes changes sign or "flips" during signal emission. Such data bit information may be obtained from a reference receiver that gets a separate measurement of this signal source's signal, or be calculated on the basis of prediction based on historical and known values.

At step 212, the sampled data is mixed to a new frequency using the receiver-doppler information and the satellite-doppler information to produce complex valued re-mixed sampled data. At step 214, the re-mixed sampled data is divided into small blocks of data. In certain embodiments, the block size of each of the small blocks of data corresponds to 1 millisecond of the re-mixed sampled data. At step 216, control passes to block 250 of FIG. 2B.

At step 250 of FIG. 2B, using the data bit information obtained at block 210 of FIG. 2A, the correlation integrals, In-phase and Quadrature ("I and Q") integrals, are calculated for each small block of data. The C/A PRN code repeats every 1 millisecond and may flip only every 20 milliseconds. However, the time may be known only approximately and hence the blocks may not be able to be classified with certainty as to which one corresponds to which position within the 20 millisecond time span before potential flips. Thus, for those blocks of data for which a flip may occur, the I and Q correlation integrals are calculated both with and without a change in sign. In other words, for those blocks of data near the 20 millisecond marks, the I and Q correlation integrals are calculated both with and without a change in sign. The I and Q correlation integrals may be calculated by using a variety of techniques. For example, the I and Q correlation integrals may be calculated by performing a numerical integration of the I and Q correlation integrals or by using a frequency domain technique such as a Fast Fourier Transform ("FFT"). The I and Q correlation integrals and their calculation are described in further detail herein.

At step 252, for each hypothesized delay value described at step 206 of FIG. 2A, and using the data bit information, the calculated I correlation integral is summed over the blocks of data. The summation takes into account the sign change due to any flips. Similarly, at block 254, the calculated Q correlation integral is summed over the blocks of data. The summation takes into account the sign change due to any flips. The summation of the I and Q correlation integrals are described in further detail herein. Certain computational savings are possible through adjusting how the sums are taken.

At step 256, if $\bar{I}$ and $\bar{Q}$ represents the summation of the I and Q correlation integrals respectively, then for each hypothesized delay value, the magnitude of ($\bar{I}, \bar{Q}$) is calculated to produce a set of magnitude values that correspond to the range of hypothesized delay values. At step 258, the magnitude values are plotted against the range of hypothesized delay values to form a graph, and it is determined whether a major peak may be identified from the graph. In certain embodiments of the invention, a major peak is identified by examining the values of the highest peak. If the height of the peak exceeds a pre-selected threshold value, then the highest peak is the major peak and the operation stops as is indicated by block 260. Otherwise, at step 262, control is returned to block 208 of FIG. 2A.

If the location of the receiver H is to be determined, for example, in earth-fixed co-ordinates, then typically the signals from at least 4 satellite vehicles are acquired in order to solve for the location and time of the receiver H. If there are fewer than 4 degrees of freedom, then fewer satellites may be needed. Additional acquisitions are also helpful in reducing error. The technique as described with reference to FIG. 2A and FIG. 2B may be used to acquire signals from each of the 4 or more satellite vehicles.

TECHNICAL PROBLEM

It is assumed that the sampled signal is denoted by $\chi_k$ where k ranges from 1 to K and $\chi_k$ represents the k-th sample from the received signal. The inter-sample duration of time is denoted by $\Delta$. Furthermore, it is known that the pre-sampling signal processing has shifted the signal to an intermediate frequency $f_{IF}$ from an original carrier frequency of $f_c$. There is an additional hypothesized frequency shift of $f_0$ due to the receiver clock and $f_i$ due to relative motion with signal source i.

For a given hypothesized signal source i, it is desired to compute:

$$I_i(\tau_i) = \sum_{k=1}^{K} x_k \xi_i(\tau_i + \Delta(k-1)) \cos(2\pi(f_{IF} + f_0 + f_i)\Delta(k-1))$$

$$Q_i(\tau_i) = \sum_{k=1}^{K} x_k \xi_i(\tau_i + \Delta(k-1)) \sin(2\pi(f_{IF} + f_0 + f_i)\Delta(k-1))$$

where $(f_{IF}+f_0+f_i)$ represents the modulation frequency at which it is desired to calculate the correlations, $\xi_i$ represents the unmodulated signal with which it is desired to correlate the data, and $\tau_i$ represents the hypothesized shift of the $\xi_i$ signal. $\tau_i$ is herein also referred to as the hypothesized delay value.

The $\xi_i$ signal itself consists of a lowpass filtering (by an operator G) of a repeating binary PRN code (represented by $\zeta_i(t)$ taking values in $\{+1, -1\}$) slowly modulated by a binary sequence of data bits (represented by a signal $v_i(t)$ also taking values in $\{+1, -1\}$). In other words, the product $v_i(t)\zeta_i(t)$ is taken and lowpass filtered by G to produce a function u(t). This function is then evaluated at time $$\frac{f_c + f_0 + f_i}{f_c} t$$

to give $\xi_i(t)$.

$$\xi_i(t) = (G(\zeta_i v_i)) \left( \frac{f_c + f_0 + f_i}{f_c} t \right)$$

The signals $\zeta_i$ and $v_i$ are both piecewise constant and can change value only at regular intervals. Each data bit in $v_i$ modulates an exact integer number M of PRN code repetitions of $\zeta_i$. The time between repetitions of the PRN code is denoted by $\ominus$. So in the case of GPS signals, $v_i$ can only change its value after $20\ominus$ time units (ms), $\ominus$ is 1 ms, M is 20, and $\zeta_i$ changes its values at an interval of $$\frac{1}{1023}$$

ms.

The time is stretched or compressed to account for various factors including the properties of the receiver clock and the relative motion of the source and receiver.

The mixing frequency $(f_{IF}+f_0+f_i)\Delta$ consists of a combination of $f_{IF}$ the intermediate frequency introduced during analog processing, $f_i$ the physical Doppler frequency introduced by the known relative motion of the receiver and the source, and $f_0$ the frequency shift introduced by imperfect syntony of the sampling clock relative to the source clock. $f_c$ is the original carrier frequency and hence $$\frac{f_c + f_0 +' f_i}{f_c}$$

is the perceived stretching or shrinking of time due to the various effects. One skilled in the art will understand that time is a quantity which only makes sense relative to clocks. The clocks at the signal source and the receiver are generally different and hence the above two reference frames have a stretching or shrinking factor of time associated with them.

In practice, it is often of interest to evaluate $(I_i, Q_i)$ for a range of $\tau_i$ values and a range of Doppler frequencies. The issue of searching over different frequencies is taken up in U.S. patent application Ser. No. 09/888,227, filed on the same day herewith, entitled "Synthesizing Coherent Correlation Sums at One or Multiple Carier Frequencies Using Correlation Sums Calculated at a Coarse Set of Frequencies", by inventors Anant Sahai and John Tsitsiklis, (Attorney Docket No. 60021-0012. Alternatively, it is important to understand that though all the frequencies and time shifts can have physical interpretations in terms of relative motion and distances, the problem of evaluating $(I_i, Q_i)$ remains well defined even if the frequencies and shifts do not necessarily correspond accurately to the real world situation.

HOW TO DO IT

The PRN code $\zeta_i$ is a known function of time that repeats every $\ominus$ time units. For GPS, it is a Gold Code Pseudorandom Number sequence of length 1023 chips. In traditional GPS systems, the data bits are considered to be unknown and hence can not be used during signal acquisition. However, it is assumed that knowledge of the values of the data bits (the $v_i$ signal) can be obtained. Such knowledge can come from an independent reading of the data bits, a prediction based on other knowledge, or the result of an earlier processing of the same data itself, etc. Such knowledge is generally referred to as "side information". This side information allows one to calculate coherent sums of the I's and Q's directly.

For notational convenience, $\tau_i$ is represented as $\Theta_i\ominus+\sigma_i$ where $\Theta_i$ is an integer and $\sigma_i$ is a positive number less than $\ominus$.

BASIC APPROACH

Figure 3:
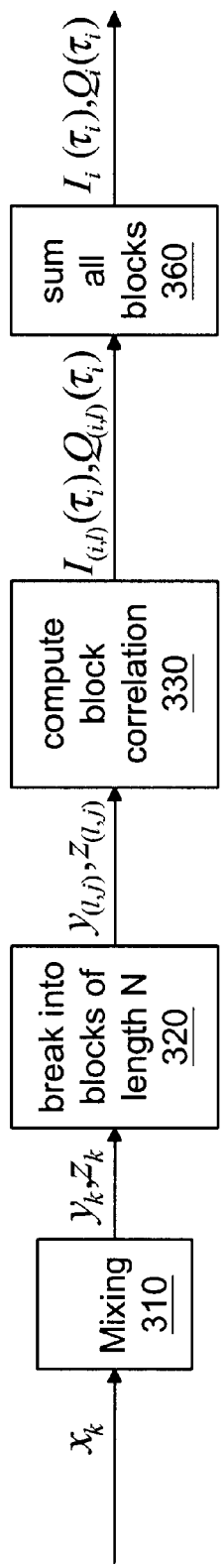
FIG. 3 is a flowchart that illustrates the basic approach for calculating I and Q according to certain embodiments.

FIG. 3 is a flowchart that illustrates the basic approach for calculating I and Q according to certain embodiments.

At step 310 of FIG. 3, the sampled signal $\chi$ is mixed with a cosine and sine at frequency $(f_{IF}+f_0+f_i)\Delta$. This produces two signals:

$$y_k = \chi_k \cos(2\pi(f_{IF}+f_0+f_i)\Delta(k-1))$$

$$z_k = \chi_k \sin(2\pi(f_{IF}+f_0+f_i)\Delta(k-1))$$

At step 320 the remixed sampled signals are segmented into smaller blocks (smaller than the minimum time $M\ominus$ between the sign changes in the modulating binary signal $v_i$) that are all nominally an integer multiple L of $\ominus$ in duration and consist of N samples each. For example, blocks that are all nominally $\ominus$ time units long can be used by setting L=1.

The j-th sample in block number l is denoted as:

$$y_{(l,j)} = y_{(l-1)N+j}$$

$$z_{(l,j)} = z_{(l-1)N+j}$$

At step 330, for each small data block, the $(I_{(i,l)}(\tau_i), Q_{(i,l)}(\tau_i))$ correlations are calculated for the various hypothesized delay values $\tau_i$ of interest which are defined as follows:

$$I_{(i,l)}(\tau_i) = \sum_{j=1}^{N} y_{(l,j)}\xi_i(\tau_i + L\Theta(l-1) + \Delta(j-1))$$

$$Q_{(i,l)}(\tau_i) = \sum_{j=1}^{N} z_{(l,j)}\xi_i(\tau_i + L\Theta(l-1) + \Delta(j-1))$$

This involves using an appropriate reference function $\xi_i$ for each block. To get some benefits from this approach, the $(\Theta, \sigma)$ representation of $\tau_i$ given by $\tau_i=\Theta_i\ominus+\sigma_i$ is used and the $v_i\zeta_i$ representation of $\xi$ is used to rewrite things as:

$$I_{(i,l)}(\tau_i) \approx \sum_{j=1}^{N} y_{(l,j)}(G(\zeta_i)v_i)\left((\vartheta+Ll)\Theta + \sigma + \frac{(f_0+f_i)L\Theta l}{f_c} + \Delta(j-1)\right)$$

$$Q_{(i,l)}(\tau_i) \approx \sum_{j=1}^{N} z_{(l,j)}(G(\zeta_i)v_i)\left((\vartheta+Ll)\Theta + \sigma + \frac{(f_0+f_i)L\Theta l}{f_c} + \Delta(j-1)\right).$$

Here two minor approximations are introduced. First, the filter G is applied only to the PRN code $\zeta_i$ and not to the result of the multiplication $\zeta_i v_i$. Second, the effect of the stretching due to the two time frames is approximated to be constant over the small data blocks and to simply move in jumps of code-phase between the blocks. This is different from the standard approach in the GPS field of using Delay Locked Loops that adjust the clock rate of the reference signal generator. Instead little jumps are made between blocks but the clock rate is left constant within a block. This second approximation is equivalent to thinking about $\sigma$ changing slowly between the blocks l by the addition of the $$\frac{(f_0+f_i)L\Theta l}{f_c}$$

terms, while dropping the within block $$\frac{(f_0+f_i)j}{f_c}$$

term in time. The combined effect of both these approximation is to simplify the computations while introducing only a minor error.

At step 360, the blocks are summed to produce I and Q as described in greater detail herein under the section entitled, "Summation of all the Block Correlations."

CLASSIFICATION OF BLOCKS ACCORDING TO HYPOTHESIZED SHIFT $\tau_i$

Figure 4:
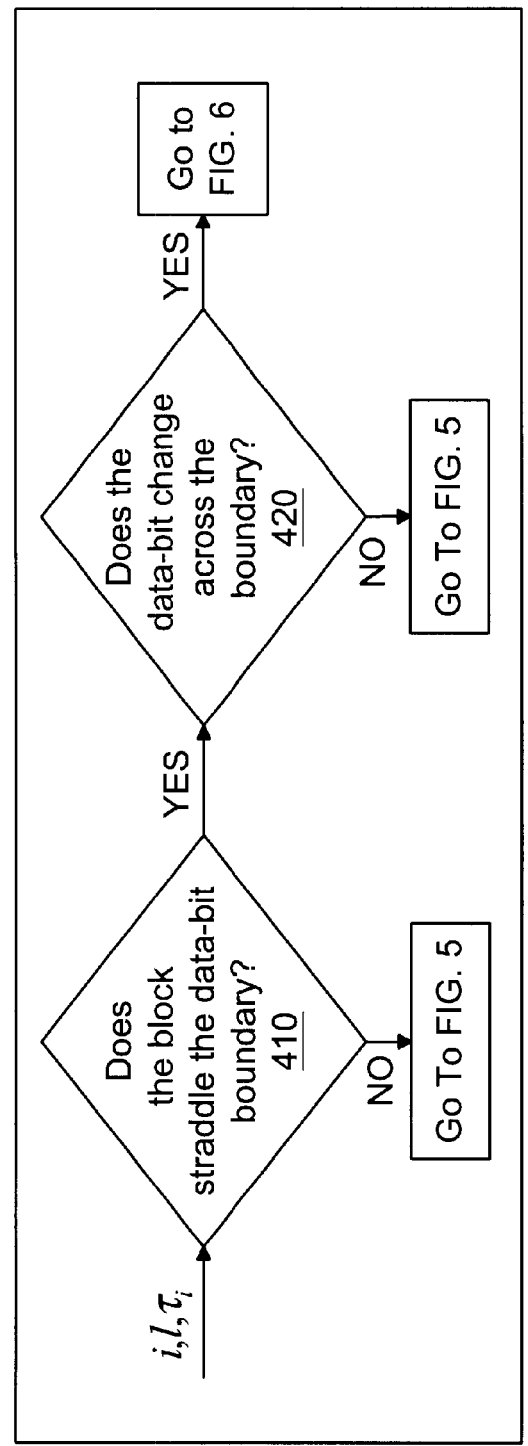
FIG. 4 is a flowchart that illustrates the classification of blocks of data according to hypothesized delay values.

FIG. 4 is a flowchart that illustrates the classification of blocks according to hypothesized shift $\tau_i$. Blocks l can be divided into two categories as shown in FIG. 4.

The first category consists of blocks for which the modulating data bit $$v_i\left((\vartheta + Ll)\Theta + \sigma + \frac{(f_0 + f_i)L\Theta l}{f_c} + \Delta(j-1)\right)$$

is a constant over j ∈ [1, N]. Such blocks are called "segments without a changing data bit."

At step 410 of FIG. 4, it is determined whether the block straddles the data-bit boundary. If it is determined that the block does not straddles the data-bit boundary, then control passes to block 420. Otherwise control passes to FIG. 5 herein. At step 420, it is determined whether the data-bit changes across the boundary. If it is determined that the data-bit changes across the boundary, then control passes to FIG. 6 herein. Otherwise, control passes to FIG. 5.

Since it is known by assumption that L<M, this condition can be checked by verifying that $$v_i\left((\vartheta + Ll)\Theta + \sigma + \frac{(f_0 + f_i)L\Theta l}{f_c}\right) =$$

$$v_i\left((\vartheta + Ll)\Theta + \sigma + \frac{(f_0 + f_i)L\Theta l}{f_c} + \Delta(N-1)\right)$$

For example, in some situations, it is also possible to establish this without having to evaluate $v_i$ itself by simply verifying that the following:

Either the block is in the same data bit, i.e., $$\left\lfloor \frac{\vartheta + Ll + \frac{(f_0 + f_i)Ll}{f_c} + \frac{\sigma}{\Theta}}{M} \right\rfloor = \left\lfloor \frac{\vartheta + Ll + \frac{(f_0 + f_i)Ll}{f_c} + \frac{\sigma + \Delta(N-1)}{\Theta}}{M} \right\rfloor$$

where the "floor" notation [a] is used to refer to the largest integer smaller than a. Or one can check that the two adjacent data bits that are straddled by the block happen to have the same value. Only if both of these conditions are false, does control pass to FIG. 5.

SEGMENT WITHOUT DATA BIT CHANGE FOR GIVEN $\tau_i$

Figure 5:
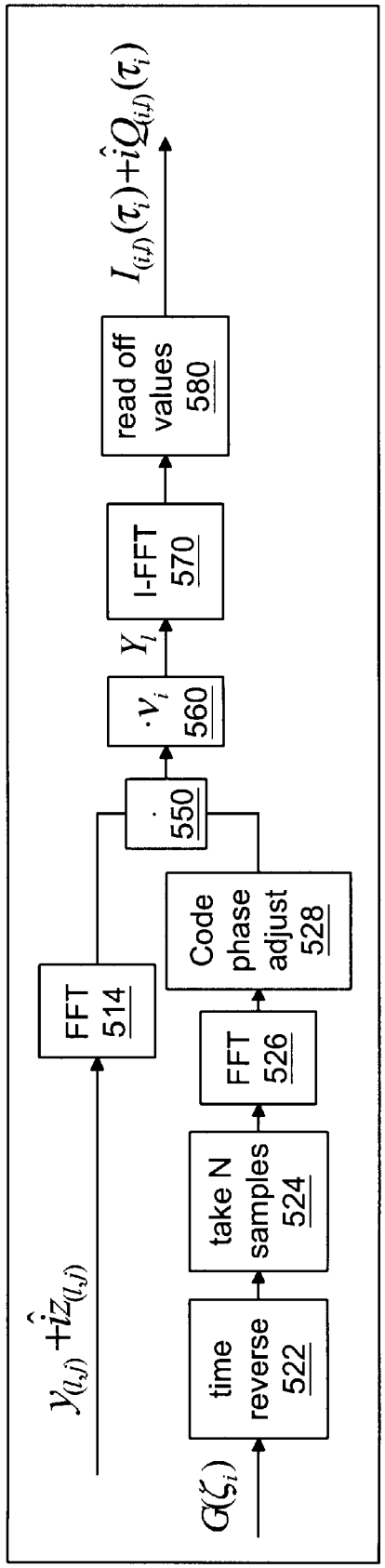
FIG. 5 is a flowchart that illustrates the process for handling segments with no data bit change.

For "segments without a changing data bit", the process as described in FIG. 5 herein, calculates:

$$I_{(i,l)}(\tau_i) = v_i\left((\vartheta + Ll)\Theta + \frac{(f_0 + f_i)L\Theta l}{f_c} + \sigma\right) \times$$

$$\sum_{j=1}^{N} y_{(l,j)}(G(\zeta_i))\left(\sigma + \frac{(f_0 + f_i)L\Theta l}{f_c} + \Delta(j-1)\right)$$

$$Q_{(i,l)}(\tau_i) = v_i\left((\vartheta + Ll)\Theta + \frac{(f_0 + f_i)L\Theta l}{f_c} + \sigma\right) \times$$

$$\sum_{j=1}^{N} z_{(l,j)}(G(\zeta_i))\left(\sigma + \frac{(f_0 + f_i)L\Theta l}{f_c} + \Delta(j-1)\right)$$

There is no need to be concerned with the data bits while performing the sum for the segment. The value of the data bit just multiplies the result. The result of this is that a representation for $G(\zeta_i)$ can be precomputed since $\zeta_i$ is just a periodic function with period $\ominus$. The expressions for $I_{(i,l)}(\tau_i)$ and $Q_{(i,l)}(\tau_i)$ can be computed in a straightforward manner in the time domain using multiplications and additions.

SEGMENT WITH DATA BIT CHANGE FOR GIVEN $\tau_i$

The other blocks are those for which the sign of the data bits $$v_i\left((\vartheta + Ll)\Theta + \sigma + \frac{(f_0 + f_i)L\Theta l}{f_c} + \Delta(j-1)\right)$$

changes over j ∈[1, N]. Such blocks are called "segments with a changing data bit." For such segments, process 600, described in FIG. 6 herein, calculates:

$$I_{(i,l)}(\tau_i) = v_i\left((\vartheta + Ll)\Theta + \sigma + \frac{(f_0 + f_i)L\Theta l}{f_c}\right) \times$$

$$\sum_{j=1}^{N} y_{(l,j)}(G(\zeta_i f_{((\vartheta+Ll)\mathrm{mod}M)}))\left(\sigma + \frac{(f_0 + f_i)L\Theta l}{f_c} + \Delta(j-1)\right)$$

$$Q_{(i,l)}(\tau_i) = v_i\left((\vartheta + Ll)\Theta + \sigma + \frac{(f_0 + f_i)L\Theta l}{f_c} + \sigma\right) \times$$

$$\sum_{j=1}^{N} z_{(l,j)}(G(\zeta_i f_{((\vartheta+Ll)\mathrm{mod}M)}))\left(\sigma + \frac{(f_0 + f_i)L\Theta l}{f_c} + \Delta(j-1)\right)$$

Here what is used is a downward step function f which is defined as follows:

$$f_h(t) = \begin{cases} +1 & \text{if } t < (M-h)\Theta \\ -1 & \text{otherwise} \end{cases}$$

Notice that this function is parameterized by an integer h that must be less than M by construction. However, because of the definition of "segments with a changing data bit," h only takes values less than or equal to L. One computational advantage of this approach is that there are only L possible reference signals that need to be considered for such segments. The expressions for $I_{(i,l)}(\tau_i)$ and $Q_{(i,l)}(\tau_i)$ can be computed in a straightforward manner in the time domain using multiplications and additions.

CALCULATION OF CORRELATIONS FOR MULTIPLE SHIFT VALUES

If a range of $\tau_i$ values is of interest, rather than a single value, some computational efficiency may be gained through appropriate choice of summing techniques. If the range of $\tau_i$ is small (one skilled in the art will see that how small depends on the details of the computational hardware/software that is available and the relative performance of different ways of doing things), the sums for ($I_{(i,l)}$, $Q_{(i,l)}$) can be calculated individually for every $\tau_i$ as described above. If the range of $\tau_i$ is large, then it can be advantageous to use Fast Fourier Transform techniques to calculate ($I_{(i,l)}$, $Q_{(i,l)}$) for an entire range of $\tau_i$ at once.

The following is a description of what is done if the range of interest in $\tau_i$ is contiguous and exactly of duration $\ominus$. Express the range of $\tau_i$ as a range of ($\Theta$, $\sigma$) pairs. Since the total range in $\tau_i$ is of duration $\ominus$, then $\sigma$ will range over its entire possible range of [0, $\ominus$). As a result, there is a clear one-to-one and invertible mapping from $\tau_i$ to $\sigma$ and vice-versa. In particular, it is clear given the range of $\tau_i$ how to calculate the mapping from $\sigma$ to $\Theta$. In general, the $\tau_i$ will map into one of two adjacent values of $\Theta_i$.

If the actual range of interest for $\tau_i$ is smaller than $\ominus$, one can simply ignore the results that are not of interest. If there are any sums that are being done on a per $\tau_i$ basis, then one skilled in the art will see that some computational effort may be saved by not doing a sum whose result is never going to impact any result that is of interest. If the range of interest for $\tau_i$ is larger than $\ominus$, one can repeat the below calculation for any number of intervals of duration $\ominus$ so as to span the true range of interest.

For each block l, categorize it into one of three categories:

SEGMENT WITH NO DATA BIT CHANGE

FIG. 5 is a flowchart that illustrates the process for handling segments with no data bit change.

If for every possible value of $\tau_i$ the block would be classified as a "segment without a changing data bit," then that classification is kept and the process proceeds as follows:

At step 514 of FIG. 5, compute the Fast Fourier Transform of the ($y_l$, $z_l$) block viewed as N complex numbers.

At step 522, take a time reversed block starting at 0 and duration $L\ominus$ of $G(\zeta_i)$.

At step 524 sample the result of 322 at $\Delta$ intervals.

At step 526, compute its Fast Fourier Transform. (Steps 322,324, and 326 can be done in advance and stored if desired since they do not depend on the $\chi_k$)

At step 528, the FFT of the time reversed block from 526 should be multiplied by a block of $$e^{\frac{i2\pi}{N}j\frac{(f_0+f_i)L\Theta l}{\Delta f_c}}$$

where j ranges from 0 to the block length minus 1. This multiplication in the frequency domain corresponds to the additional code-phase delay introduced by time compression or dilation due to the Dopplers. One skilled in the art can also see that the results of this multiplication can be precomputed for a variety of small (corresponding to less than the interval between samples) code-phase shifts. Any integer number of $\Delta$ steps left-over can be noted as $\delta$ and their effect taken care of later.

One particular way of doing this is to choose a positive integer C>1 and to consider the C shifts of $$\frac{\Delta}{C}$$

each. A particular $$\frac{(f_0+f_i)L\Theta l}{f_c}$$

can be represented as $$\frac{(f_0+f_i)L\Theta l}{f_c} \approx \left(\delta+\frac{c}{C}\right)\Delta+\epsilon \quad \text{where} \quad |\epsilon| \leq \frac{\Delta}{2C}.$$

Then at this step the shift corresponding to $$\frac{c\Delta}{C}$$

can be used and the residual integer $\delta$ is dealt with at a later stage. Alternatively, the shift corresponding to $$\frac{(C\delta+c)\Delta}{C}$$

could be directly used in the frequency domain at this stage.

At step 550, multiply the two Fourier Transforms from block 514 and 528 pointwise by each other. In some embodiments of this invention, the frequency domain code-phase shift of the previous step is combined into this step since it is also a pointwise multiplication.

At step 560, multiply the resulting block from 350 by the value of the data bit $$v_i\left((\vartheta+Ll)\Theta+\sigma+\frac{(f_0+f_i)L\Theta l}{f_c}\right)$$

(This can not vary between the different $\tau_i$ since if it did, some of the $\tau_i$ would correspond to "segments with a changing data bit") This complex-valued block of length N is represented by the symbol $Y_l$.

At step 570, take the inverse Fast Fourier Transform of the resulting block $Y_l$. The m-th complex sample in that block corresponds to the $(I_{(i,l)}, Q_{(i,l)})(\tau_i)$ for the $\tau_i$ that corresponds to $\sigma=(m-1+\delta)\Delta$. Any residual $\delta$ shift can also be taken care of by doing a circular shift on the inverse FFT before reading off the values. In the embodiments where the entire shift is dealt with in the frequency domain, simply consider $\delta=0$.

At step 580, read off the values.

SEGMENT WITH A DATA BIT CHANGE FOR ALL SHIFT VALUES

Figure 6:
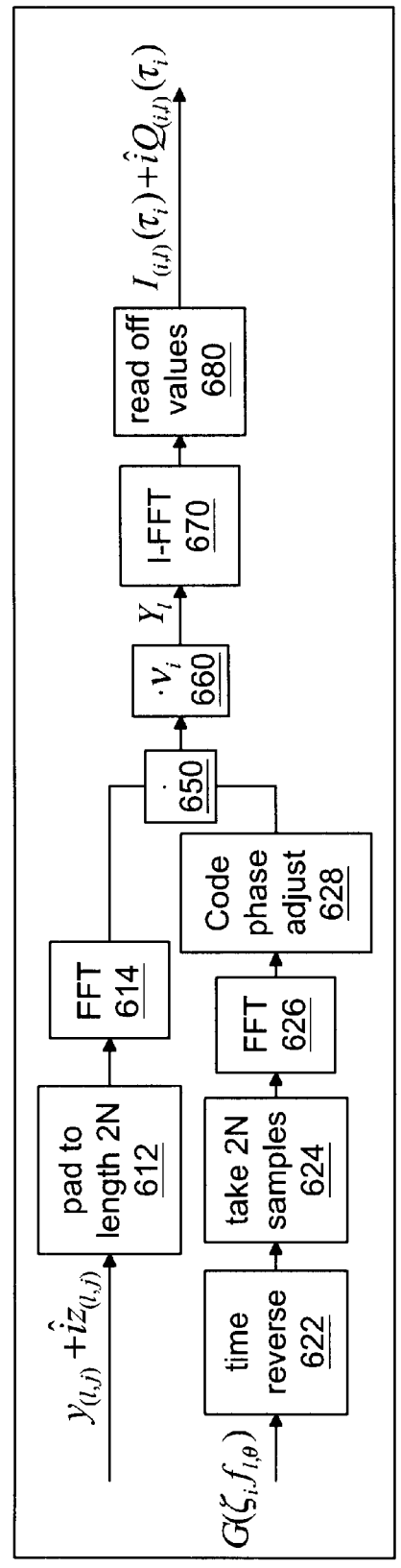
FIG. 6 is a flowchart that illustrates the process for handling segments with a data bit change for all shift values.

FIG. 6 is a flowchart that illustrates the process for handling segments with a data bit change for all shift values.

If for every possible value of $\tau_i$ the block would be classified as a "segment with a changing data bit," then that classification is kept and the process proceeds as follows:

At step 612, take the ($y_l$, $z_l$) block viewed as N complex numbers and pad it at the end with N values of (0, 0) to get a block of length 2N.

At step 614, take the Fast Fourier Transform of this block.

At step 622, take a time reversed block starting at 0 and of duration $2L\ominus$ of $G(\zeta_i f_{M-L})$ At step 624, sample it at $\Delta$ intervals. (This corresponds to a low-passed version of a PRN code followed by itself negated.)

At step 626, compute its Fast Fourier Transform. (Blocks 622,624,626 can be done in advance and stored if desired since they do not depend on the $\chi_k$).

At step 628, the FFT of the time reversed block should be multiplied by a block of $$e^{\frac{i\pi}{N}j\frac{(f_0+f_i)L\Theta l}{\Delta f_c}}$$

corresponding to the additional delay introduced by time compression or dilation due to the Dopplers. As in the computations for the "segments without a changing data bit," this multiplication can also be precomputed for a variety of small (corresponding to less than the interval between samples) code-phase shifts.

One particular way of doing this is to choose a positive integer C>1 and to consider the C shifts of $$\frac{\Delta}{C}$$

each. A particular $$\frac{(f_0 + f_i)L\Theta l}{f_c}$$

could be represented as $$\frac{(f_0 + f_i)L\Theta l}{f_c} \approx \left(\delta + \frac{c}{C}\right)\Delta + \epsilon \text{ where } |\epsilon| \leq \frac{\Delta}{2C}.$$

Then at this step the shift corresponding to $$\frac{c\Delta}{C}$$

is used.

At step 650, multiply the two Fourier Transforms pointwise by each other. As noted earlier, the frequency domain code-phase shift of the previous step can be combined into this step since it is also a pointwise multiplication.

At step 660, multiply the resulting block by the value of the data bit $v_i$ at the beginning of the range of interest. (This can not vary between the different $\tau_i$ since if it did, some of the $\tau_i$ would correspond to "segments without a changing data bit"). This complex-valued block of length 2N is represented by the symbol $Y_l$.

At step 670, take the inverse Fast Fourier Transform of the resulting block $Y_l$.

At step 680, the m-th complex sample in that block corresponds to the $(I_{(i,l)}, Q_{(i,l)})(\tau_i)$ for the $\tau_i$ that corresponds to (L−M+((Θ+Ll) mod M))Θ+σ=(m−1+δ)Δ.

As in the case of "segments without a changing data bit", there are alternative ways of dealing with δ. Overall, only N values of the inverse FFT need to be examined since the others are just inverted copies by construction.

SEGMENT WITH A DATA BIT CHANGE FOR SOME SHIFT VALUES

Figure 7:
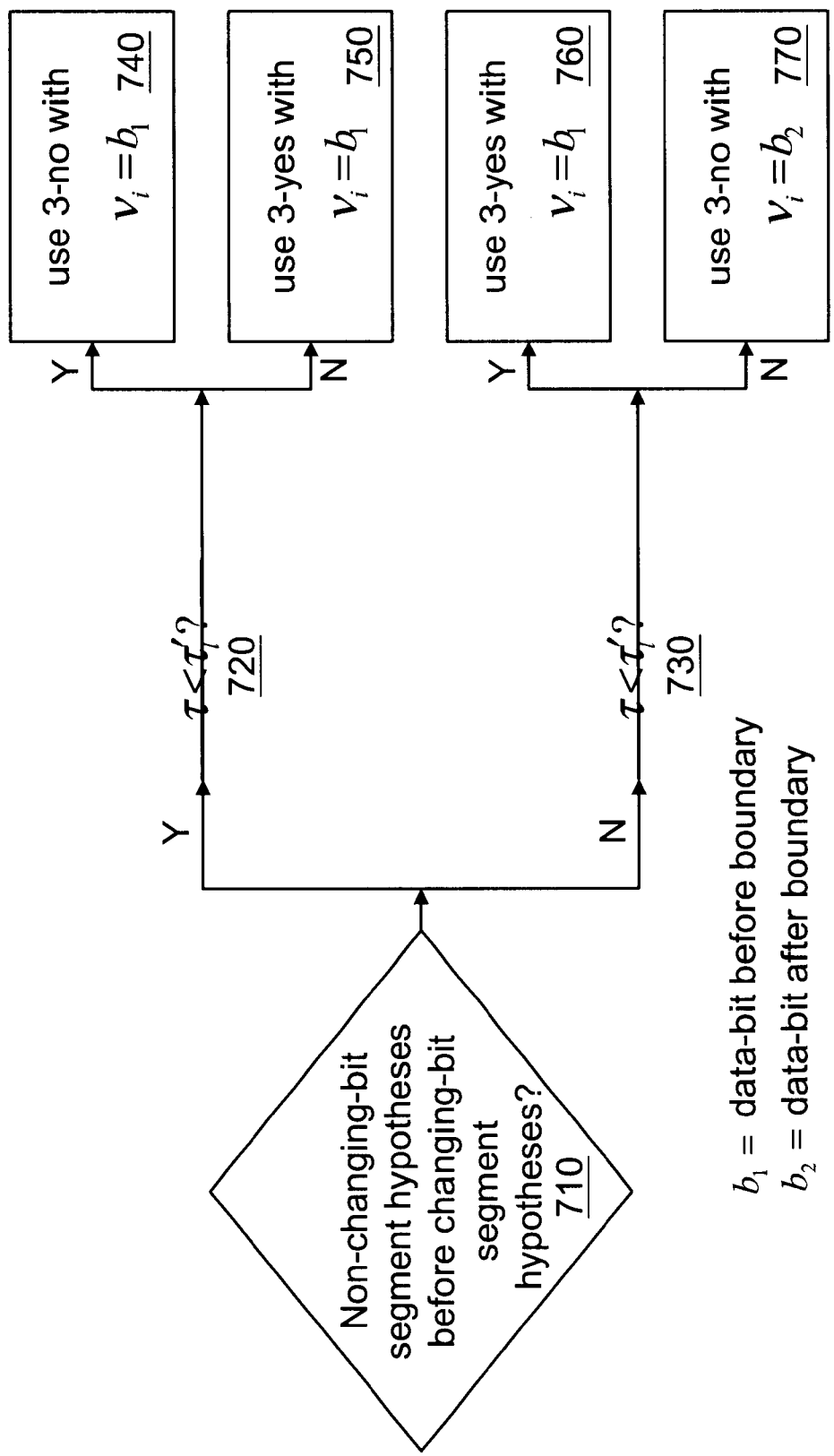
FIG. 7 is a flowchart that illustrates the process for handling segments with data bit change for some shift values.

FIG. 7 is a flowchart that illustrates the process for handling segments with data bit change for some shift values.

If some possible values of $\tau_i$ cause the block 1 to be classified as a "segment without a changing data bit" while other $\tau_i$ values would result in classification as a "segment with a changing data bit" then classify the segment as a "segment possibly with a changing data bit" and proceed as follows.

Make the calculations in FIG. 5 and FIG. 6 for block 1 (treated as both the classifications "segment without a changing data bit" and the classification "segment with a changing data bit."). However skip blocks 560 of FIG. 5 and 660 of FIG. 6. and do not multiply yet by the values of the data bit $v_i$. Also, the code-phase shift is handled entirely in the frequency domain and there will not be residual δΔ terms to deal with.

Determine the explicit decision rule as in block 410 of FIG. 4 that indicates whether a given $\tau_i$ corresponds to a "segment without a changing data bit" or a "segment with a changing data bit."

At steps 740, 750, 760, 770, get the $(I_{(i,l)}, Q_{(i,l)})(\tau_i)$ over the range of $\tau_i$ of interest by splicing together the results from the two calculations already done. Multiply each value by the appropriate data bit $v_i$ for the $\tau_i$ namely:

$$v_i\left((\vartheta + Ll)\Theta + \sigma + \frac{(f_0 + f_i)L\Theta l}{f_c}\right)$$

where the (Θ, σ) correspond to the $\tau_i$ of interest.

At steps 720, 730, it is determined if τ is less than $\tau'_{i,l}$. One way of doing this is to notice that the nature of the signal is such that the explicit decision rule can be expressed as a cut by a single $\tau'_{i,l}$ of the hypothesized τ into two regions: one in which one uses the "segment without a changing data bit" and another in which one uses the "segment with a changing data bit."

At step 710, it is determined whether the "segment with a changing data bit" portion corresponds to values for $\tau_i$ that are before or after the values for $\tau_i$ corresponding to the "segment with a changing data bit" portion. Thus, each spliced part might be multiplied by a different value for the data bit depending on whether the "segment with a changing data bit" portion corresponds to values for $\tau_i$ that are before or after the values for $\tau_i$ corresponding to the "segment with a changing data bit" portion.

Alternatively, one of ordinary skill in the art will see that a strategy exactly analogous to the case of "segments with a changing data bit" could be followed except that the incoming signal is padded with 2N zeros instead of just N of them and a reference signal of length 3N consisting of a PRN code, PRN code, −PRN code sequence is used. In effect, the first part of the reference with two PRN codes next to each other models the situation without a changing data bit and the part of the reference with the PRN, −PRN next to each other code models the situation with a changing data bit. Beyond that, it is a simple matter of splicing together the appropriate pieces based on the $\tau_i$ hypotheses.

SUMMATION OF ALL THE BLOCK CORRELATIONS

At step 360 of FIG. 3, to coherently combine the results on the blocks into the calculation of the (I, Q) integrals themselves, sum up the values as follows:

$$I_i(\tau_i) = \sum_{l=1}^{\frac{K}{N}} I_{(i,l)}(\tau_i)$$

$$Q_i(\tau_i) = \sum_{l=1}^{\frac{K}{N}} Q_{(i,l)}(\tau_i)$$

Such sums need to be done only for the $\tau_i$ of interest and can even be done on a per-demand basis to save computational effort. One skilled in the art will see that N is chosen to be divisible by K or some standard correction is otherwise applied.

SUMMING THE BLOCK CORRELATIONS BEFORE INVERSE FFT

Figure 8:
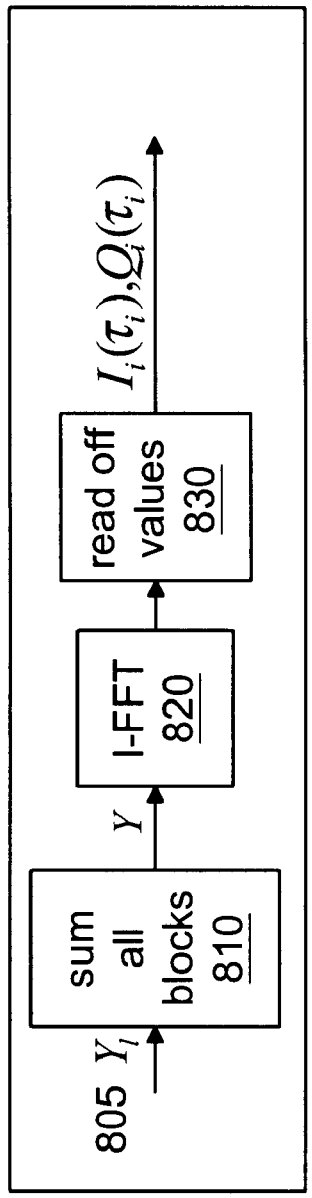
FIG. 8 is a flowchart that illustrates a method of increasing computational savings when dealing with a range of $\tau_i$ values.

The above method results in a good approximation to the desired coherent sums. However, when dealing with a range of $\tau_i$ values, additional computational savings are possible by rearranging the steps as described below. FIG. 8 is a flowchart that illustrates a method of increasing computational savings when dealing with a range of $\tau_i$ values.

Proceed with the prior steps as before for all the blocks that are classified as a "segment possibly with a changing data bit."

In the prior steps, for all the blocks that are definitely "segments without a changing data bit" or "segments with a changing data bit" do not calculate the final inverse Fast Fourier Transform. Instead leave the blocks in the pre-inversion state $Y_l$ (labeled as 805 in FIG. 8) after performing the step as described in block 560 of FIG. 5 and block 660 of FIG. 6 respectively.

At step 810 of FIG. 8, add up (pointwise) all the pre-inversion length N "segments without a changing data bit" into a new block of length N. Similarly add up all the pre-inversion length 2N "segments with a changing data bit" into a new block of length 2N, grouped by Ll mod M:

$$Y_k^{with} = \sum_{\substack{l \in \text{segments with changing data bits} \\ \text{and } Ll \bmod M = k}} Y_l$$

$$Y^{without} = \sum_{l \in \text{segments without changing data bits}} Y_l$$

At step 820, take the inverse Fast Fourier Transform of the length N block $Y_k^{without}$ and also of the length 2N blocks $Y_k^{with}$. Because the code-phase shifts in the frequency domain are already accounted for, the same rules can be applied as was done previously to associate these two inverse Fast Fourier Transforms with (I, Q) values for given delays $\tau_i$.

Sum up the (I, Q)($\tau_i$) values corresponding to the same $\tau_i$ from the previous step with those corresponding to "segments possibly with a changing data bit". One of ordinary skill in the art will understand that further speedups are possible by applying the technique used in blocks 810, 820 to the "segments possibly with a changing data bit". In that case, the sums from block 810 need to be grouped so as to ensure that items in a given sum all have the same explicit splicing-together rule $\tau'_{i,l}$ associating them with (I, Q)($\tau_i$) for a given $\tau_i$. This splicing-together rule changes slightly whenever the code-phase adjustment advances/recedes by an additional whole $\Delta$ units of time.

At step 830, the values are read off.

SUMMING THE BLOCKS BEFORE THE FFT

Figure 9:
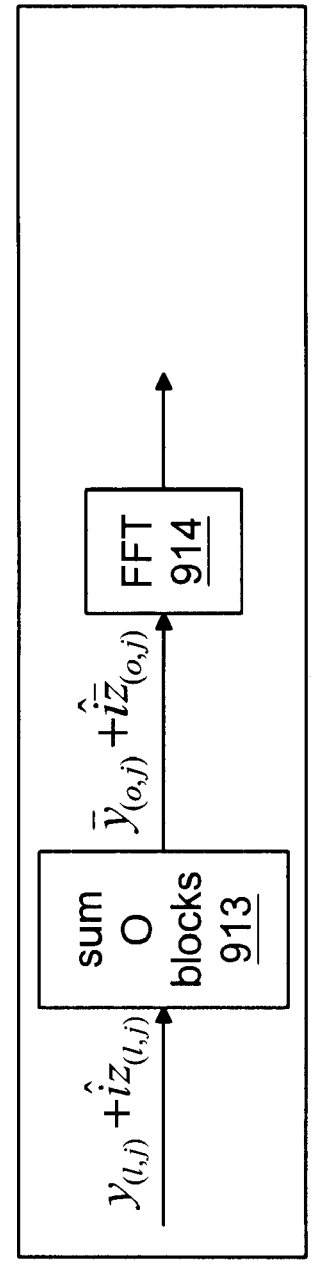
FIG. 9 is a block diagram that illustrates the basic approach of summing the $(y_j, z_j)$ blocks before the FFT of block 514 of FIG. 5.
Figure 10:
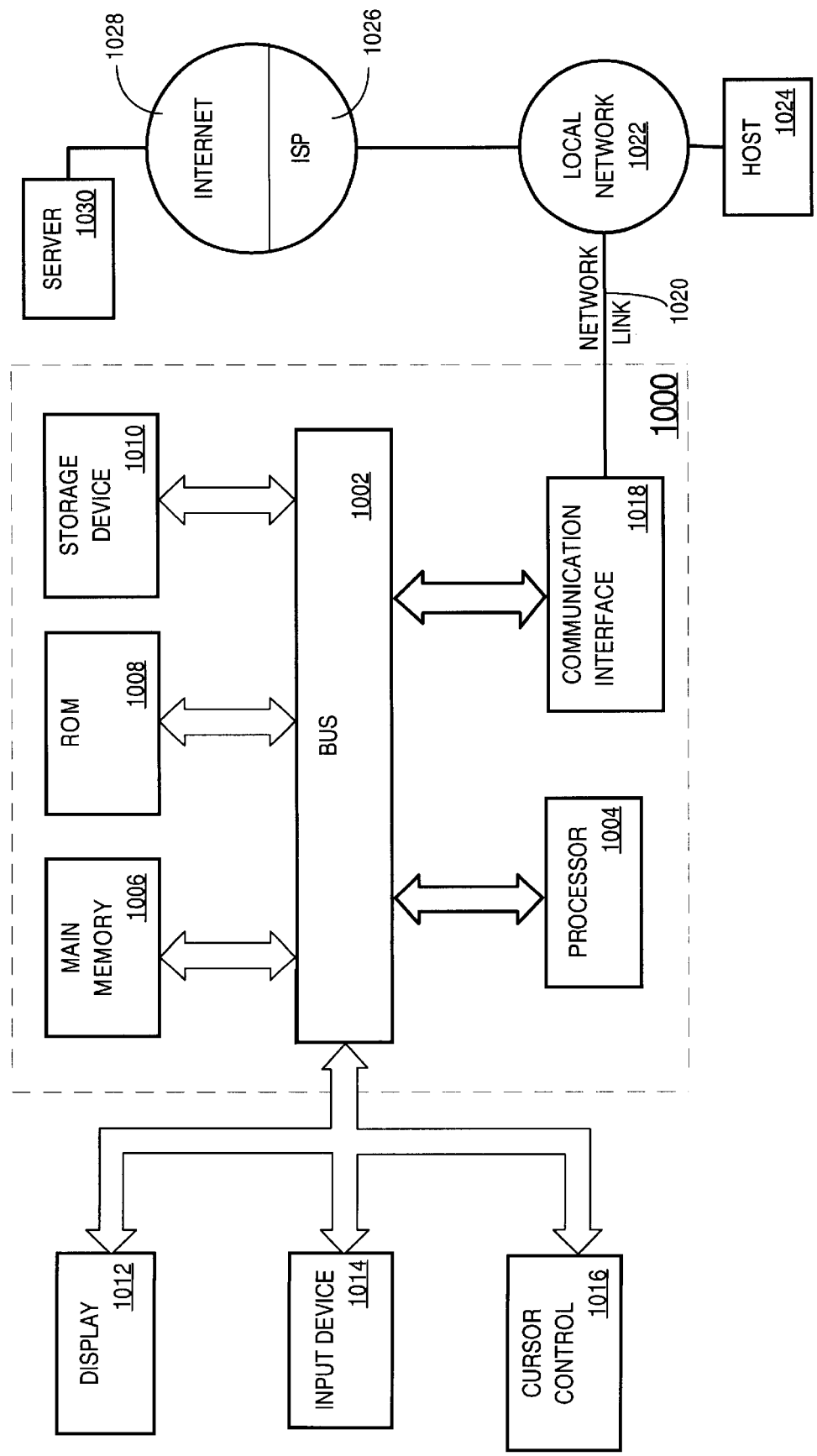
FIG. 10 is a block diagram illustrating a computer system on which embodiments of the invention may be implemented.

If there is a willingness to tolerate a greater approximation loss, further computational savings are possible by summing the ($y_l$, $z_l$) blocks before the FFT of block 514 of FIG. 5. FIG. 9 is a block diagram that illustrates the basic approach of summing the ($y_l$, $z_l$) blocks before the FFT of block 514 of FIG. 5. As shown in FIG. 9, given a block summing size of O, the j-th sample in summed-block o is defined as:

$$\bar{y}_{(o,j)} = \sum_{\substack{l \in \text{segments without changing data bits} \\ (o-1)O < l \leq oO}} v_i \left( Ll\Theta + \frac{(f_0 + f_i)Ll\Theta}{f_c} \right) y_{(l,j)}$$

$$\bar{z}_{(o,j)} = \sum_{\substack{l \in \text{segments without changing data bits} \\ (o-1)O < l \leq oO}} v_i \left( Ll\Theta + \frac{(f_0 + f_i)Ll\Theta}{f_c} \right) z_{(l,j)}$$

The resulting blocks are then treated just like input to block 514 of FIG. 5 and are correlated with the PRN code using the FFT in block 914. The difference is that in block 528 of FIG. 5, what is needed is a code phase adjustment of multiplying by a block of $$e^{\frac{i2\pi}{N} j \frac{(f_0 + f_i)L\Theta \left( oO - \frac{O}{2} \right)}{\Delta f_c}}$$

The $$oO - \frac{O}{2}$$

reflects the equivalent l for this summed-block. The $$-\frac{O}{2}$$

is to center the blocks in time so that the l corresponds to the middle block composing the summed-block.

As before, the "segments with a changing data bit" and the "segments possibly with a changing data bit" can be dealt with in a parallel track and they can be brought all together at the end.

WHEN THE BLOCK SUMMING IS LONG (O LARGE)

As one skilled in the art will notice, the approximation loss in the above comes from not doing the code-phase-adjustments on the individual blocks before summing them up. This is usually done for computational reasons since the exact code-phase adjustments are computationally expensive to do if the signal is not already in the frequency domain. However, if O is large, then the needed code-phase adjustment can also grow large and hence the approximation gets poorer.

Fortunately, at the sampled data level there are some code-phase adjustments which are computationally simple to do. One skilled in the art will see that it is easy to do a code-phase shift that is an integer number of intersample periods $\Delta$. This can be done by modifying the above and using:

$$\bar{y}_{(o,j)} = \sum_{\substack{l \in \text{segments without changing data bits} \\ (o-1)O < l \leq oO}} v_i \left( Ll\Theta + \frac{(f_0 + f_i)Ll\Theta}{f_c} \right) y_{\left( l, j - \left\lfloor \frac{(f_0 + f_i)L\Theta(l - (o-1)O)}{f_c \Delta} \right\rfloor \right)}$$

$$\bar{z}_{(o,j)} = \sum_{\substack{l \in \text{segments without changing data bits} \\ (o-1)O < l \leq oO}} v_i \left( Ll\Theta + \frac{(f_0 + f_i)Ll\Theta}{f_c} \right) z_{\left( l, j - \left\lfloor \frac{(f_0 + f_i)L\Theta(l - (o-1)O)}{f_c \Delta} \right\rfloor \right)}$$

The subscripts on Y and Z above can sometimes become either negative or exceed the block length due to the code-phase adjustments above. In such cases, one skilled in the art will see that borrowing values from adjacent blocks will give a suitable solution, and if the underlying block size is large, such edge effects can even be neglected entirely without any significant losses.

The above takes care of any integer $\Delta$ code-phase adjustment, but still leaves the fractional part. One skilled in the art will see that the fractional part is the average of the uncorrected code-phase adjustments and hence one still needs to apply a frequency domain correction of multiplying in the frequencies domain by a block of $$e^{\frac{i2\pi}{N}j\frac{\Delta}{O}\left(\sum_{l=(o-1)O+1}^{oO}\frac{(f_0+f_i)L\Theta l}{f_c\Delta}-\left[\frac{(f_0+f_i)L\Theta(l-(o-1)O)}{f_c\Delta}\right]\right)}$$

rather than the previously given formula. As before, one skilled in the art can implement such a correction in a variety of means besides the direct frequency domain approach.

CHOOSING THE BLOCK SUMMING SIZE O

Choosing a block summing size is determined by balancing a tradeoff between computational burden and accuracy of the approximation. Increasing O reduces the computational burden of the algorithm because we effectively replace taking O different FFTs with a single FFT. Similarly, O different block multiplications by the transform of the reference PRN code and code-phase-adjustments are replaced with a single such block multiplication.

The downside is that an increased O degrades the accuracy of the approximation by not doing the code-phase adjustments on each block. For a given O, the amount of this degradation is determined by the lowpass filtering G done to the received signal and the magnitude of the Doppler shifts ($f_i$, $f_0$). This loss compounds whatever inherent degradation in SNR is experienced from having an incorrect estimate of the mixing frequency.

In the GPS context, for an ideal lowpass filter that rejects all frequencies with magnitude greater than 1 MHz, the degradation from O is estimated by the formula:

$$\left(\frac{\left|\sum_{j=0}^{O-1}\int_{f=-10^6}^{10^6}\left(\frac{\sin\pi f 10^{-6}}{\pi f}\right)^2 e^{\frac{i2\pi}{N}j\frac{(f_0+f_i)L\Theta}{f_c}}df\right|^2}{\int_{f=-10^6}^{10^6}\left(\frac{\sin\pi f 10^{-6}}{\pi f}\right)^2 dfO}\right)$$

One skilled in the art can easily see how the above formula should be modified to deal with other frequencies and filters. The important thing to notice is that the amount of degradation depends on the amount of known Doppler. The higher the Doppler, the more the blurring degrades accuracy by reducing the effective SNR. It is important to remember that if one does the integer $\Delta$ code-phase adjustments above, then the residual degradation can never exceed a single $\Delta$. The degradation estimate therefore saturates at the value for O where the shift corresponds to a single $\Delta$.

Choosing an exact value for O in any particular situation therefore depends on the estimated Dopplers and the desired tradeoff between computational efficiency and accuracy. One can either do this calculation in advance, or can evaluate expressions estimating the cost and benefit and use the resulting estimated costs and benefits to choose a value for O that is suitable based on the exact situation being faced by the algorithm. As a result, the O chosen need not be the same for different signal sources being considered, even for a single instance of sampled data being processed.

USE

Once (I, Q)($\tau_i$) calculated, $(I^2+Q^2)(\tau_i)$ can be used to evaluate a given delay hypothesis $\tau_i$. The larger it is, the more likely it is that a signal from that particular source i with that particular delay $\tau_i$ is present in the process that helped produce the observed data.

The approach described herein produces a coherent sum and can be varied by one skilled in the art in many useful ways. For example, if all that is known are the potential times of the sign changes but not whether or not they occur, the above can be repeated for every possible set of sign changes for the data length of question. One skilled in the art will see that this can be accomplished in part by reclassifying any segment that can potentially straddle a bit boundary as a "segment with a possible data bit flip." This is a small fraction of the data blocks. Then, for every hypothesized sequence of data bit values, the big sums above can be redone using the new values.

The final step of squaring and looking at the magnitude can be done for all the possibilities and the strongest peak chosen. For example, if GPS signals of duration 100 ms are considered, then there are possibly 5 sign flips giving 32 possibilities. If the time domain is used, each possibility only requires adding together two sets of 5 numbers each with possibly different signs. If the range of $\tau_i$ is small enough, this is not an insurmountably great computational burden. Furthermore, it is highly parallelizable.

HARDWARE OVERVIEW

An embodiment of the invention may be implemented using a computer system that includes a processor for processing information. The Computer system also includes a main memory, such as a random access memory (RAM) or other dynamic storage device, coupled to a bus for storing information and instructions to be executed by the processor. The main memory also may be used for storing temporary variables or other intermediate information during execution of instructions to be executed by the processor. The computer system further includes a read only memory (ROM) or other static storage device coupled to the bus for storing static information and instructions for the processor. A storage device, such as a magnetic disk or optical disk, is provided and coupled to the bus for storing information and instructions.

The invention is related to the use of the computer system for implementing the techniques described herein. According to one embodiment of the invention, those techniques are implemented by the computer system in response to the processor executing one or more sequences of one or more instructions contained in main memory. Such instructions may be read into the main memory from another computer-readable medium, such as the storage device. Execution of the sequences of instructions contained in the main memory causes the processor to perform the process steps described herein. One or more processors in a multi-processing arrangement may also be employed to execute the sequences of instructions contained in the main memory. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to the processor for execution. Such a medium may take many forms, including but not limited to, non-volatile media, volatile media, and transmission media. Non-volatile media includes, for example, optical or magnetic disks, such as the storage device. Volatile media includes dynamic memory, such as the main memory. Transmission media includes coaxial cables, copper wire and fiber optics, including the wires that comprise the bus. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor for execution. For example, the instructions may initially be carried on a magnetic disk of a remote computer. The remote computer can load the instructions into its dynamic memory and send the instructions over a telephone line using a modem. A modem local to computer system can receive the data on the telephone line and use an infrared transmitter to convert the data to an infrared signal. An infrared detector coupled to the bus can receive the data carried in the infrared signal and place the data on the bus. The bus carries the data to the main memory, from which the processor retrieves and executes the instructions. The instructions received by the main memory may optionally be stored on the storage device either before or after execution by the processor.

The computer system also includes a communication interface coupled to the bus. The communication interface provides a two-way data communication coupling to a network link that is connected to a local network. For example, the communication interface may be an integrated services digital network (ISDN) card or a modem to provide a data communication connection to a corresponding type of telephone line. As another example, the communication interface may be a local area network (LAN) card to provide a data communication connection to a compatible LAN. Wireless links may also be implemented. In any such implementation, the communication interface sends and receives electrical, electromagnetic or optical signals that carry digital data streams representing various types of information.

The network link typically provides data communication through one or more networks to other data devices. For example, the network link may provide a connection through the local network to a host computer or to data equipment operated by an Internet Service Provider (ISP). The ISP in turn provides data communication services through the worldwide packet data communication network now commonly referred to as the "Internet". The local network and the Internet both use electrical, electromagnetic or optical signals that carry digital data streams. The signals through the various networks and the signals on the network link and through the communication interface, which carry the digital data to and from the computer system, are exemplary forms of carrier waves transporting the information.

The computer system can send messages and receive data, including program code, through the network(s), the network link and the communication interface. In the Internet example, a server might transmit a requested code for an application program through the Internet, the ISP, the local network and the communication interface. In accordance with the invention, one such downloaded application implements the techniques described herein.

The received code may be executed by the processor as it is received, and/or stored in the storage device, or other non-volatile storage for later execution. In this manner, the computer system may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for aiding in an acquisition of an acquired signal from a received signal, the method comprising the computer-implemented steps of:

receiving sampled data associated with the received signal;

receiving data bit information that indicates which portions of an emitted signal have changes in sign corresponding to flips in a C/A PRN code of the signal source associated with the received signal;

mixing the sampled data to produce a mixed sampled data;

dividing the mixed sampled data into a plurality of data blocks; and for each block of the plurality of blocks using the data bit information for computing I and Q correlation integrals between the sampled data and the emitted signal.

2. The method of claim 1, wherein computing the correlation integrals further comprises making a code-phase adjustment that is based on at least one Doppler information that is a member of a set of Doppler information that includes a receiver-Doppler information, a source-Doppler information and a relative motion-Doppler information, wherein:

the receiver-Doppler information is associated with a receiver that produces and sends the sampled data;

the source-Doppler information is associated with the signal source; and the relative motion Doppler is associated with a relative motion of the signal source to the receiver.

3. The method of claim 1, wherein the correlation integrals are associated with I and Q correlation integrals corresponding to an In Phase component and a Quadrature component respectively of the sampled data.

4. The method of claim 2, wherein making the code-phase adjustment is performed by multiplying an appropriate complex function with Fast Fourier Transforms of I and Q correlation integrals, wherein the I and Q correlation integrals correspond to the I and Q correlation integrals.

5. The method of claim 2, wherein making the code-phase adjustment is performed by multiplying an appropriate complex function with Fast Fourier Transforms of a reference signal that is associated with the signal source.

6. The method of claim 2, wherein making the code-phase adjustment is performed by multiplying an appropriate complex function with Fast Fourier Transforms of the mixed sampled data.

7. The method of claim 1, wherein the sampled data is digitized data produced by digitizing the received signal.

8. The method of claim 1, wherein mixing the sampled data involves mixing with a receiver-Doppler information, a source-Doppler information and a relative motion Doppler information, wherein:

the receiver-Doppler information is associated with a receiver that produces and sends the sampled data;

the source-Doppler information is associated with the signal source; and the relative motion Doppler information is associated with a relative motion of the signal source to the receiver.

9. The method of claim 1, wherein for each data block of the plurality of data blocks and using the data bit information for computing the correlation integrals involves computing I and Q correlation integrals over a range of hypothesized delay values for the sampled data.

10. The method of claim 1, wherein for each data block of the plurality of data blocks and using the data bit information for computing the correlation integrals involves computing Fast Fourier Transforms of I and Q correlation integrals over a range of hypothesized delay values for each data block.

11. The method of claim 9, further comprising the step of:

for each hypothesized delay value in the range of hypothesized delay values, summing the I and Q correlation integrals respectively, over all the data blocks of the plurality of data blocks using the data bit information.

12. The method of claim 10, further comprising the steps of:

summing Fast Fourier Transforms of the I and Q correlation integrals for the data blocks using the data bit information; and performing an inverse Fast Fourier Transform to obtain the I and Q correlation integrals for each hypothesized delay value.

13. The method of claim 1, further comprising the steps of:

summing the mixed sampled data over subsets of data blocks using the data bit information to produced summed data blocks; and computing the I and Q correlation integrals based on the summed data blocks; and summing the I and Q correlation integrals over all the data blocks.

14. The method of claim 9, further comprising the steps of:

for each hypothesized delay value in the range of hypothesized delay values, calculating a magnitude of the I and Q correlation integrals that were previously summed over all the data blocks, to produce a set of magnitude calculations, wherein the set of magnitude calculations correspond to the range of hypothesized delay values; and determining that the acquired signal is acquired if a highest peak is greater than a predetermined value, wherein the highest peak is identified from the set of magnitude calculations.

15. The method of claim 9, wherein a range of hypothesized delay values is based on:

an approximate time that the receiver received the received signal;

a relative approximate position information between the signal source and the receiver; and any known uncertainties in the approximate time and the relative approximate position information.

16. A method for aiding in an acquisition of an acquired signal from a received signal, the method comprising the computer-implemented steps of:

receiving sampled data associated with the received signal;

receiving data bit information that indicates which portions of an emitted signal changes in sign corresponding to flips in a C/A PRN code corresponding to the signal source associated with the received signal;

mixing the sampled data with a receiver-Doppler information, a source-Doppler information and a motion-Doppler information to produce a mixed sampled data, wherein:

the receiver-Doppler information is associated with a receiver that sends the sampled data;

the source-Doppler information is associated with the signal source; and the relative motion Doppler information is associated with a relative motion of the signal source to the receiver;

dividing the mixed sampled data into a plurality of data blocks;

for each data block of the plurality of data blocks and using the data bit information, computing, over a range of hypothesized delay values, I and Q correlation integrals corresponding to an In Phase component and a Quadrature component respectively of the mixed sampled data;

for each hypothesized delay value in the range of hypothesized delay values, summing the I and Q correlation integrals respectively, over all the data blocks of the plurality of data blocks using the data bit information;

for each hypothesized delay value in the range of hypothesized delay values, calculating a magnitude of the I and Q correlation integrals that were previously summed over all the data blocks, to produce a set of magnitude calculations, wherein the set of magnitude calculations correspond to the range of hypothesized delay values.

17. A method for acquiring an acquired signal from a received signal, the method comprising the computer-implemented steps of:

receiving sampled data associated with the received signal;

receiving data bit information that indicates which portions of an emitted signal changes in sign corresponding to flips in a C/A PRN code corresponding to the signal source associated with the received signal;

mixing the sampled data with a receiver-Doppler information, a source-Doppler information, and a motion-Doppler information to produce a mixed sampled data, wherein:

the receiver-Doppler information is associated with a receiver that sends the sampled data;

the source-Doppler information is associated with the signal source;

the relative motion Doppler information is associated with a relative motion of the signal source to the receiver;

dividing the mixed sampled data into a plurality of data blocks;

for each data block of the plurality of data blocks and using the data bit information, computing Fast Fourier Transforms of I and Q correlation integrals, over a range of hypothesized delay values;

summing the Fast Fourier Transforms of I and Q correlation integrals for the data blocks using the data bit information over the range of hypothesized delay values; and performing an inverse Fast Fourier Transform to obtain the I and Q correlation integrals for each hypothesized delay value;

for each hypothesized delay value in the range of hypothesized delay values, calculating a magnitude of the I and Q correlation integrals that were previously summed over all the data blocks, to produce a set of magnitude calculations, wherein the set of magnitude calculations correspond to the range of hypothesized delay values; and determining that the acquired signal is acquired if a highest peak is greater than a predetermined value, wherein the highest peak is identified from the set of magnitude calculations.

18. A method for aiding in an acquisition of an acquired signal from a received signal, the method comprising the computer-implemented steps of:

digitizing the received signal by a receiver to produce sampled data;

receiving from the receiver the sampled data;

receiving data bit information that indicates which portions of an emitted signal changes in sign corresponding to flips in a C/A PRN code corresponding to the signal source associated with the received signal;

mixing the sampled data with a receiver-Doppler information, a source-Doppler information and a motion-Doppler information to produce a mixed sampled data, wherein:

the receiver-Doppler information is associated with a receiver that sends the sampled data;

the source-Doppler information is associated with the signal source; and the relative motion Doppler information is associated with a relative motion of the signal source to the receiver;

dividing the mixed sampled data into a plurality of data blocks;

for each data block of the plurality of data blocks and using the data bit information, computing, over a range of hypothesized delay values, I and Q correlation integrals corresponding to an In Phase component and a Quadrature component respectively of the mixed sampled data;

for each hypothesized delay value in the range of hypothesized delay values, summing the I and Q correlation integrals respectively, over all the data blocks of the plurality of data blocks using the data bit information;

for each hypothesized delay value in the range of hypothesized delay values, calculating a magnitude of the I and Q correlation integrals that were previously summed over all the data blocks, to produce a set of magnitude calculations, wherein the set of magnitude calculations correspond to the range of hypothesized delay values.

19. A method for acquiring an acquired signal from a received signal, the method comprising the computer-implemented steps of:

digitizing the received signal by a receiver to produce sampled data;

receiving from the receiver the sampled data;

receiving data bit information that indicates which portions of an emitted signal changes in sign corresponding to flips in a C/A PRN code corresponding to the signal source associated with the received signal;

mixing the sampled data with a receiver-Doppler information, a source-Doppler information, and a motion-Doppler information to produce a mixed sampled data, wherein:

the receiver-Doppler information is associated with a receiver that sends the sampled data;

the source-Doppler information is associated with the signal source;

the relative motion Doppler information is associated with a relative motion of the signal source to the receiver;

dividing the mixed sampled data into a plurality of data blocks;

for each data block of the plurality of data blocks and using the data bit information, computing, over a range of hypothesized delay values, I and Q correlation integrals corresponding to an In Phase component and a Quadrature component respectively of the sampled data;

for each hypothesized delay value in the range of hypothesized delay values, summing the I and Q correlation integrals respectively, over all the data blocks of the plurality of data blocks using the data bit information;

for each hypothesized delay value in the range of hypothesized delay values, calculating a magnitude of the I and Q correlation integrals that were previously summed over all the data blocks, to produce a set of magnitude calculations, wherein the set of magnitude calculations correspond to the range of hypothesized delay values; and determining that the acquired signal is acquired if a highest peak is greater than a predetermined value, wherein the highest peak is identified from the set of magnitude calculations.

* * * * *